J. B. ZIMDARS.
AUTOMOBILE SEAT.
APPLICATION FILED JUNE 13, 1910.

1,017,488.

Patented Feb. 13, 1912.

Witnesses;
F. E. Maynard.
T. Kasberg.

Inventor;
John B. Zimdars
By G. H. Strong.
his Atty

UNITED STATES PATENT OFFICE.

JOHN B. ZIMDARS, OF SAN FRANCISCO, CALIFORNIA

AUTOMOBILE-SEAT.

1,017,488.

Specification of Letters Patent.

Patented Feb. 13, 1912.

Application filed June 13, 1910. Serial No. 566,627.

*To all whom it may concern:*

Be it known that I, JOHN B. ZIMDARS, citizen of the United States, residing in the city and county of San Francisco and State of California, have invented new and useful Improvements in Automobile-Seats, of which the following is a specification.

My invention relates to improvements in supplemental seats such as are adapted for use in automobiles.

It consists of one or more seats having hinged floor standards capable of turning to allow the seat to be folded down to the front and a back normally locked with relation to the seat, said back being capable of being folded into the plane of the seat when the latter is turned down, and the back serving as a rail or support for robes and the like.

It also consists in details of construction which will be more fully explained by reference to the accompanying drawings, in which—

Figure 1:
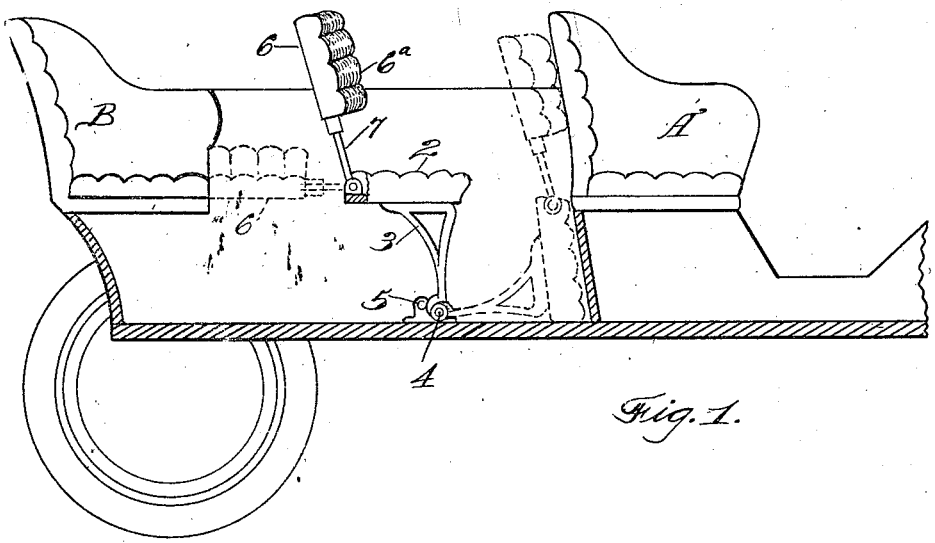
Figure 2:
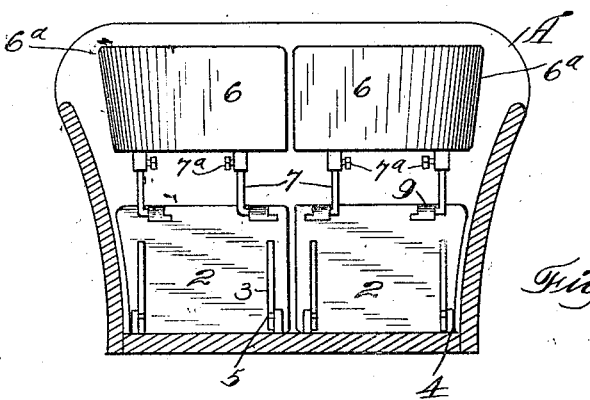
Figure 3:
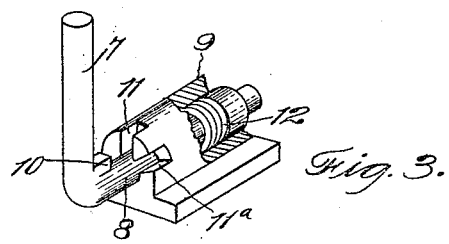

Figure 1 is a side elevation showing the seat and back in their folded position, and showing them in position for use, in dotted lines. Fig. 2 is a rear view of the same. Fig. 3 is a view of the back retaining latch.

In automobiles designed to carry a large number of passengers it is common to place supplemental seats between the permanent front and back seats of the vehicle. These are pivoted and turnable, or in some cases foldable, to get them out of the way when not in use.

It is the object of my invention to provide such a seat with a back which is also turnable with relation to the seat in such manner that the parts in their folded position occupy less space and the back is utilized as a rail contiguous to the back of the front seat, for the purpose of hanging robes, etc.

As shown in the drawing, A indicates the front and B the rear seat of an automobile.

2 shows one or more intermediate seats, having standards 3 upon which they are supported. These standards are made as shown in Fig. 1, the lower end of the front portion being strongly pivoted, as at 4, and at the rear of this pivoted portion are stops 5, against which the rear portions of the bracket 3 contact when the seat is in its upright position, and it is thus maintained and prevented from dropping backwardly.

The back 6 of the seat is carried upon stout rods 7, which extend downwardly and are connected with the rear of the seat portion 2, as follows: At the lower ends of the supports 7 are stout pins 8, projecting at right angles with the parts 7 and slidable in tubular sleeves or casings 9, which are strongly fixed to the rear of the seat. 10 are projecting lugs or keys at the junction of the supports 7 and the pins 8, and these keys are adapted to enter slots 11 in the contiguous ends of the sleeves 9. 12 are springs which normally act upon the pins 8 so as to draw the locking lugs 10 into engagement with the respective slots 11. One set of these slots is so arranged that when the seat and the back 6 are in position in readiness for use, the uppermost of the slots 11 will be engaged.

When it is desired to place the seats out of use, the back supports 7 are moved outwardly, compressing the spring 12 until the lug 10 is disengaged from the slot 11. The seat standards are then folded backwardly until they are substantially in line with the seat 2, when the lug 10 will then engage with the other slot 11$^a$, which will thus retain the seat and back substantially in line. By thus folding the back to the rear, the pivot supports 4 of the standards may be placed much nearer to the rear of the front side by reason of not having to make room for the upholstery and thickness of the back 6 in the same space. For the above reason, the seat could be made higher, the upholstery deeper, and the seat deeper and wider than could be done under the old method. When folded down in this position, the upholstery of the seat 2 lies closely against the back of the seat A, and the back 6 also lies contiguous to the upper portion of the back of the seat A. There are usually a pair of seats 6, as shown in Fig. 2, and the outer ends of these seats are curved, as shown at 6$^a$, so that when the edges of these curved portions are in contact with the back of the front seat A, a considerable space will be formed between that portion of the seat which extends between the curves 6$^a$, and this space is utilized to receive the robes, coats, or other articles which it is desired to hang out of the way. I am thus enabled to dispense with a projecting rail upon the back of the front seat, and the seats are more compact, occupying less room, and are more easily manipulated than would be the case if the back were folded down upon the seats themselves. This method also allows of the backs of these seats being longer and higher, and thus more comfortable than if they folded forward; and also allows of the ends of the backs being curved, thus furnishing additional comfort and protection; and for these reasons would accommodate three persons, if necessary. The supports 7 of the back 6 may be made telescopic with set screws 7ª and thus allow the back to be extended for height, and also so that the rest 6 of each seat 2 may be turned rearward to a horizontal plane with the back seat B; thus the combined back seat B, the back-rest 6 and the seat 2 may be converted into a practically continuous couch for invalids or injured persons or for sleeping purposes.

Having thus described my invention, what I claim and desire to secure by Letters-Patent, is:

A vehicle having front and rear seats and a plurality of parallel intermediate seats having eccentrically journaled lower ends and coacting brackets to support the seats in their normal position or allow them to be tilted forwardly on edge, seat backs having the outer edges curved and the contiguous edges in line, standards upon which the backs are adjustable, said standards having horizontal extensions with lugs in the angles, brackets fixed to the seats having slots, and springs by which the lugs are engaged to lock the seat backs in a normal or extended position.

In testimony whereof I have hereunto set my hand in the presence of two subscribing witnesses.

JOHN B. ZIMDARS.

Witnesses:
CHARLES A. PENFIELD,
E. G. BLASDEL.